United States Patent [19]

Pfaff et al.

[11] Patent Number: 4,480,301

[45] Date of Patent: Oct. 30, 1984

[54] METHOD AND APPARATUS FOR CONTROLLING A PULSED FREQUENCY CONVERTER

[75] Inventors: Gerhard Pfaff, Erlangen; Albert Wick, Hagenau, both of Fed. Rep. of Germany

[73] Assignee: Siemens Aktiengesellschaft, Munich, Fed. Rep. of Germany

[21] Appl. No.: 399,249

[22] Filed: Jul. 19, 1982

[30] Foreign Application Priority Data

Aug. 7, 1981 [DE] Fed. Rep. of Germany ....... 3131344

[51] Int. Cl.$^3$ .......................................... H02M 7/515
[52] U.S. Cl. ..................................... 363/137; 363/58; 363/160; 363/164; 363/165
[58] Field of Search ....................... 363/56, 57, 58, 96, 363/137, 157, 159, 160, 164, 165

Primary Examiner—William M. Shoop
Assistant Examiner—Anita M. Ault
Attorney, Agent, or Firm—Kenyon & Kenyon

[57] ABSTRACT

A system for forming addressing signals for addressing respective converter switches of a frequency converter; the frequency converter being of the type which is provided with DC input terminals for receiving electrical energy which is conducted to phase output terminals when the converter switches are operated in response to the addressing signals. Each of the combinations of converter switches is associated with a discrete space vector, and a load voltage vector is determined. In operation, two of the discrete space vectors which are adjacent to the voltage space vector are addressed for respective dwell times which correspond to the components of the voltage space vector as impressed upon the adjacent discrete space vectors. Either prior to or after the addressing of the adjacent discrete space vectors within a switching cycle, a short circuit state is addressed. In one embodiment, the order in which the adjacent discrete space vectors are addressed is reversed for each subsequent switching cycle. Also, the DC input terminals to which the phase outputs are short circuited are alternated.

14 Claims, 6 Drawing Figures

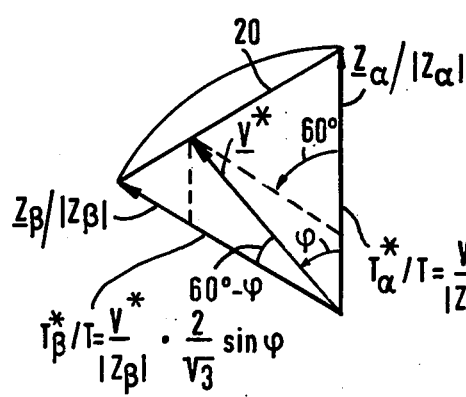
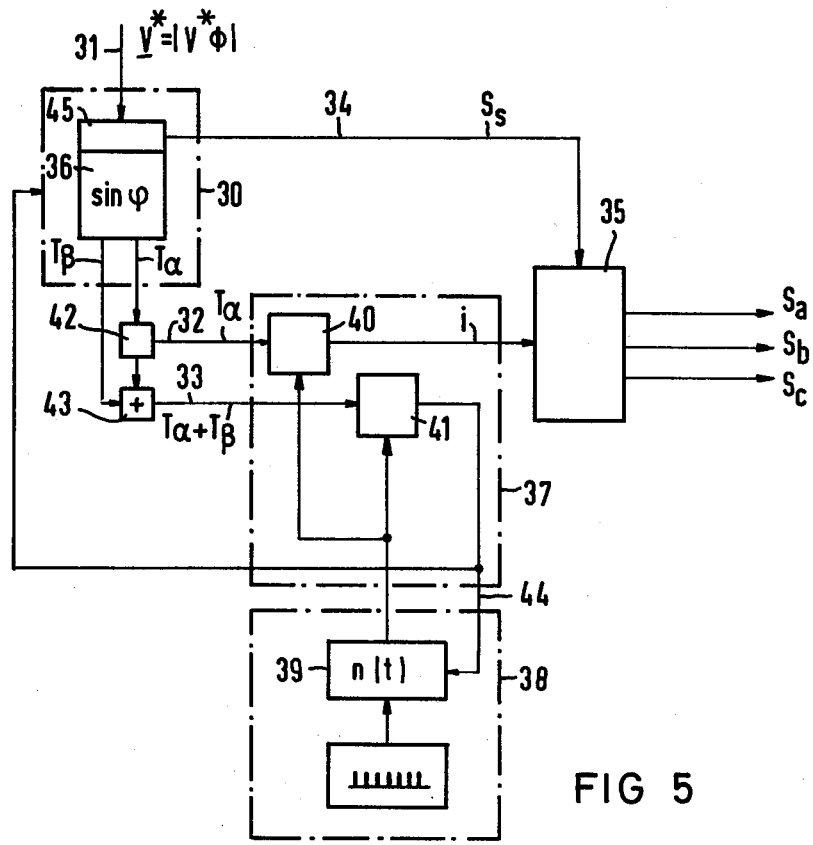
FIG 3
FIG 4
FIG 5

METHOD AND APPARATUS FOR CONTROLLING A PULSED FREQUENCY CONVERTER

BACKGROUND OF THE INVENTION

This invention relates generally to systems for driving frequency converters, and more particularly, to a system wherein electrical valves within the converter are addressed by firing signals which correspond to predetermined reference voltage and frequency values for producing at output terminals of the converter a voltage space vector which is determined from a combination of possible discrete vectors.

In a known arrangement, a constant DC input voltage is provided at DC input terminals of a converter. Such a known converter is also provided with at least one output terminal which is connected to one or more electrical valves or switches which can be addressed by firing signals such that the positive and negitive polarities of the DC input voltage are selectably applied, in response to the firing signal, at the output terminal. Thus, by providing an appropriate firing signal, the output terminal of the converter can be connected selectably to either the positive or negative polarity of the DC input voltage. If the converter switches are operated rapidly in response to the firing signals, it is possible to produce at the output terminal of the converter a selected voltage waveform, illustratively a continuous, approximate sinusoid. Such an approximate sinusoid is produced by the succession of rapidily occuring voltage pulses having respective durations which depend upon the desired output voltage. Circuitry can be provided for smoothing the pulse sequences to achieve a continuous voltage waveform.

In embodiments where the converter provides a plurality of output voltages at respective output terminals, each such output voltage can be individually smoothed. Moreover, the output voltages can be arranged to be phase-shifted with respect to one another to produce, for example, a three-phase supply. When such a three-phase supply is connected to a load, the phase voltages can be combined into a characteristic vector which corresponds to the voltage state of the load. Such a load may be a stator winding of a rotating-field machine, thereby corresponding to a three-phase symmetrical load having a neutral terminal which is not connected to a reference potential. In this known three-phase arrangement, the arrangement of converter switches in the converter can assume only eight switch combination states, thereby allowing only a finite number of possible states of the resulting space vector. Two such states correspond to situations where all of the outputs are connected to one of the positive or negative DC input terminals such that all output voltages are in the same state. The remaining six states correspond to respective three-dimensional space vectors which can be addressed by associated combinations of firing signals.

A definite voltage state is unambiguously assigned to each of the eight possible converter switch combinations to avoid inverter short-circuit states during transitions of the firing signals. As noted, six discrete space vectors are produced for each of six respective firing signal combinations, as well as two zero state combinations for the firing signals where the output terminals are shorted to each other via a selectable one of the DC input terminals. A quasi-continuous control over the output voltage can be achieved by pulsing back and forth between adjacent ones of the discrete vectors so that a desired vectorial average is produced which approximates a desired output voltage, illustratively for controlling a rotating-field machine. One known pulse control system utilizes a sine-triangle modulation method for forming control signals which provide the quasi-continuous control over the phase voltages. Such control signals are produced with respect to reference values by generating in an input stage a sinusoidal reference voltage for each output of the inverter, thereby producing a constant revolving voltage space vector. A generator provides a running time signal which may be a triangle voltage which is either free-running or synchronized with the rotating voltage space vector. Each such sine voltage is interrogated with the triangular voltage in a comparator stage, and, in the event of equality therebetween, the DC input voltage is connected with reversed polarity to the respective output terminal of the converter by changing the firing signal for the converter switches which are associated with the particular output terminal. If the frequency of the running time signal is sufficiently high, an approximately sinusoidal phase voltage can be produced by smoothing the output pulses which are combined to form the voltage space vector which is to be quasi-continuously controlled.

It is, therefore, an object of this invention to provide a simple and inexpensive controller for a pulse converter which is particularly adapted to digital operation. Digital operation permits relatively high accuracy to be achieved at low cost.

It is a further object of this invention to provide a control system for a pulsed inverter wherein the harmonic content of the output voltage is low.

SUMMARY OF THE INVENTION

The foregoing and other objects are achieved by this invention which provides an improved system for controlling the formation of firing signals for a pulsed converter. In the inventive system, discrete vectors which are adjacent to one another and to a quasi-continuously variable voltage space vector, are determined. The quasi-continuously variable voltage space vector is composed of a plurality of reference values of the phase voltages. At the start of a running time signal, the components of the variable voltage space vector corresponding to the adjacent discrete vectors are produced in the form of control signals. After the running time signal has been started, the two firing signal combinations which determine the adjacent discrete vectors are each addressed for durations of time which correspond to the respective components.

In one embodiment of the invention, one of the same firing signal combinations is addressed during a switching cycle which is determined by the running time signal. The respective dwell time periods of the two firing combinations are determined by an angle quantity which is determined relative to the position of the voltage space vector with respect to the two adjacent discrete vectors and the duration of the switching cycle, which is determined from the angle quantity and the magnitude of the voltage space vector. Alternatively, such dwell times for the two firing signal combinations are determined from the angle quantity and the magnitude of the voltage space vector.

BRIEF DESCRIPTION OF THE DRAWINGS

Comprehension of the invention is facilitated by reading the following detailed description in conjunction with the annexed drawings, in which:

FIGS. 2 and 3 illustrate discrete vectors $Z_1$ to $Z_6$ which are associated with corresponding firing signal combinations of the converter switches;

FIG. 4 shwos the space vector of the output voltage and its components in relation to the adjacent discrete vectors;

FIG. 5 is a block and line representation of one embodiment of the invention.

DETAILED DESCRIPTION

Figure 1:
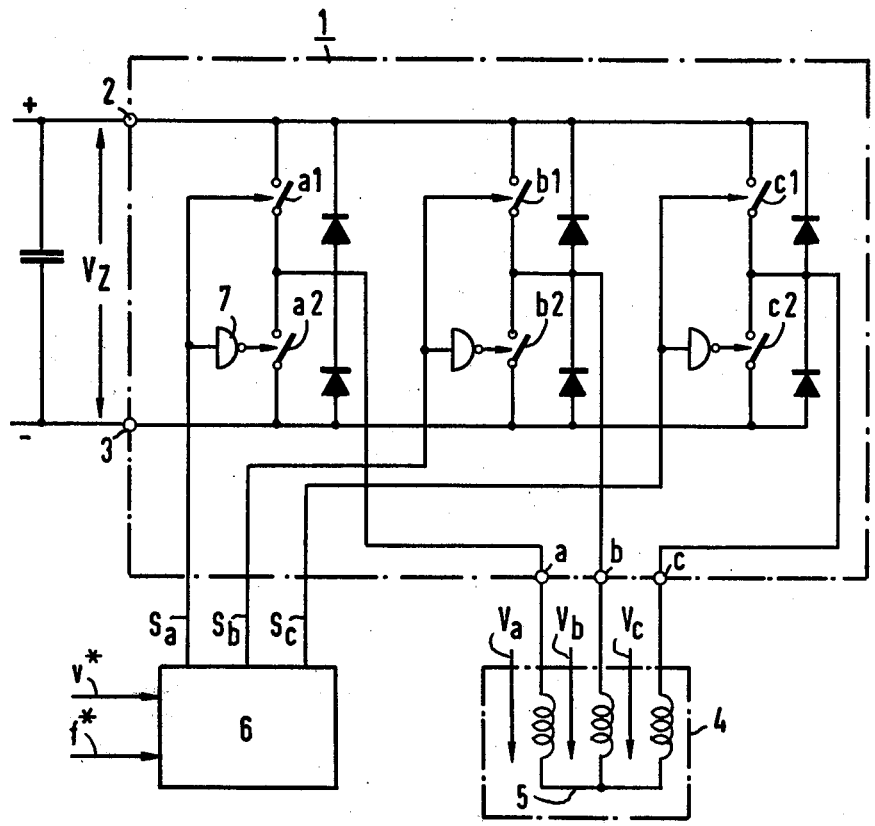
FIG. 1 is a block and schematic representation of a pulsed frequency converter arrangement for supplying a symmetrical load having a floating neutral point.

FIG. 1 shows a converter 1 which is provided with terminals 2 and 3 for connecting to the positive and negative polarities, respectively, of a DC input voltage $V_z$. An inverter output terminal a can be connected to either positive input 2 or negative input 3 via converter switches a1 and a2, respectively. Similarly, output terminal b can be connected to either input terminal 2 or 3 by actuation of converter switches b1 and b2 and output terminal c can be so connected by operation of converter switches c1 and c2. In the drawing, the converter switches are schematically represented as switches, although they may, in a practicable embodiment, be switching transistors or thyristors. Each such switching transistor or thyristor is provided with an antiparallel bypass diode, such diodes being shown in the figure but not specifically designated. The figure further shows a symmetrical load 4 with phase voltage $V_a$, $V_b$, and $V_c$, and a neutral point 5. The load is connected to outputs a, b, and c of converter 1, and neutral point 5 is not connected to a reference potential.

A control unit 6 produces control signals $S_a$, $S_b$, and $S_c$ for controlling the converter switches. Such control signals are in the form of digital signals where, for example, the state $S_a=1$ is assigned to close switch a1 and open switch a2. An inverting element 7 is shown schematically to indicate that converter switches a1 and a2 operate opposite to one another. Thus, for the state $S_a=0$, switch a1 is open and switch a2 is closed. Converter switches b1 and b2 are similarly controlled by control signal $S_b$, and converter switches c1 and c2 are controlled by control signal $S_c$. In order to preserve the clarity of the drawing, additional circuitry contained in converter 1 is not shown in the drawing. Such additional circuitry may include output amplifiers and protective devices to prevent brief converter short circuits during which current might flow between terminals 2 and 3 via the converter switches.

During each operating state where only one of the converter switches for each output terminal of the converter is closed and the magnitude of the DC input voltage $V_Z$ is known, a corresponding combination of firing signals $S_a$, $S_b$, and $S_c$ can be described. The particluar combination would correspond to one of eight possible combinations of the three firing signals; the combinations being associated with one of discrete vectors $Z_1$ to $Z_6$, or to $Z_0$ which corresponds to either of the same state circuit states. Thus, state $Z_0$ corresponds to $S_a=S_b=S_c=1$, for cases where all of the outputs are shorted to terminal 2, or to $S_a=S_b=S_c=0$ where the output terminals are short circuited to terminal 3.

Figure 2:
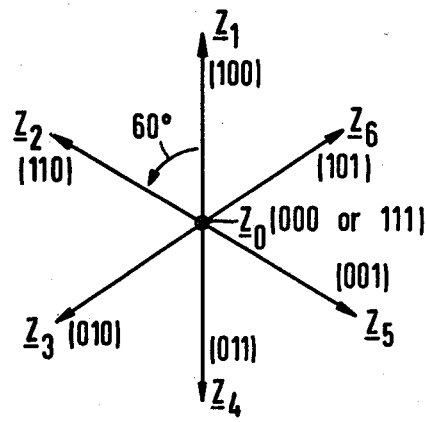

FIG. 2 shows a field of three-dimensional space vectors wherein the space vectors $Z_1$ to $Z_6$ are shown. Moreover, the state associated with $Z_0$ is shown as the center point from which the discrete vectors originate. As shown in FIG. 2, each of the vectors can be represented by a three-bit word. For example, if output b is switched from b2 to b1 (from $S_b=0$ to $S_b=1$), for $S_a$ and $S_c$ remaining constant at respective values of 1 and 0, this corresponds to a transition from $Z_1$ to $Z_2$. If it is assumed that the amplitude of the output voltage is proportional to the input voltage $V_Z$ when a converter switch is fired, and the voltage drops in the converter are ignored, the following relationship applies:

$$Z_1 = \ldots = Z_6 = 2/3 V_Z, \text{ and } Z_0 = 0.$$

The present invention is premised upon the concept that a desired voltage space vector which is arranged intermediate of two discrete victors can be addressed by selecting the two adjacent discrete vectors, and possibly the zero state $Z_0$, alternatingly such that a vectorial average approximates the desired voltage space vector. The duration of the dwell times during which each of the discrete vectors is addressed is calculated for the corresponding firing combinations such that, through vectorial addition, of the states, the desired reference voltage space vector is obtained. The switching sequence by which such states are generated can be optimized and precalculated. The invention method, which can be generalized so as to be applicable to frequency converters having different numbers of outputs, will be explained in further detail with reference to the illustrative three-phase embodiment.

In FIG. 2, one revolution of the voltage space vector V (not shown) is divided by the discrete vectors $Z_1$ to $Z_6$ into six angular regions. FIG. 3 shows the voltage vector considered only with respect to its adjacent discrete vectors $Z_\alpha$ and $Z_\beta$, where the particular vector having precedence for a given direction of angular rotation is designated as $Z_\alpha$, and the subsequent discrete vector is designated with $Z_\beta$. Thus, discrete vector $Z_\alpha$ is adjacent to the right of the voltage vector, and the discrete vector $Z_\beta$ is adjacent to the left. A transition is therefore made from the angle of rotation $\Phi$, where $0° \leq \Phi \leq 360°$, to the angle variable $\phi = \Phi$ module 60°. If within a time interval T the firing combination belonging to the vector adjacent to the right, illustratively $Z_1$ in FIG. 1 such that $Z_\alpha = Z_1$ is addressed for a period (dwell time) $T_\alpha$, and the vector adjacent to the left corresponds to $Z_2$ such that $Z_\beta = Z_2$, one obtains as the average:

$$\underline{V} = \frac{T_\alpha}{T} \underline{Z}_\alpha + \frac{T_\beta}{T} \underline{Z}_\beta \tag{1}$$

However, if the components of the voltage space vector are considered with respect to unit vectors, $$\frac{\underline{Z}_\alpha}{|\underline{Z}_\alpha|} \text{ and } \frac{\underline{Z}_\beta}{|\underline{Z}_\beta|}$$

the geometry of FIG. 3 results in:

$$\underline{V} = \sin(60° - \phi)\frac{2}{\sqrt{3}}|V|\frac{Z_\alpha}{|Z_\alpha|} + (\sin\phi)\frac{2}{\sqrt{3}}|V|\frac{Z_\beta}{|Z_\beta|} \quad (2)$$

$$\text{where } |Z_\alpha| = |Z_\beta| = \frac{2}{3}V_Z \quad (3)$$

The condition of equation (3) can be satisfied for the dwell times;

$$\frac{T_\alpha}{T} = \sin(60° - \phi)\cdot\sqrt{3}\frac{|V|}{V_Z} \quad (3a)$$

$$\frac{T_\beta}{T} = \sin\phi\cdot\sqrt{3}\frac{|V|}{V_Z} \quad (3b)$$

(The symbols "Z" and "Z" are used interchangeably.)

In accordance with the invention, control signals are formed for the quasi-continuous control of the phase voltages by starting with a space vector which is determined from preset voltage reference values. For example, if the phase voltages to be addressed are given directly by reference values, such desired values can be combined in a desired space vector for the load voltage having the magnitude absolute V and an angle of rotation Φ. On the other hand, it is often simpler to set-in the space vector V itself by an amount absolute V and angle Φ.

Two adjacent vectors, $Z_\alpha$ and $Z_\beta$, are determined for the instantaneous position of the voltage space vector. Moreover, the components of the voltage space vector which coincide with the adjacent discrete vectors are determined as control signals. Such control signals are used to form switching signals for switching off the respectively addressed firing combination by comparison with a running time signal. The components, therefore, serve for performing a time comparison which determines the dwelling times for the inverter valves which are fired in the respective combination. Such components are calculated in advance, or at least shortly after the start of the running time signal. After the start of the running time signal, the firing combinations which determine the adjacent vectors are addressed for the previously calculated dwelling times which are given by the corresponding components.

FIG. 5 is a block and line representation of a control apparatus which can be advantageously used for performing the foregoing calculations. The control apparatus contains an input stage 30, a generator 38 for producing the running time signal, a comparator stage 37, and a distributor stage 35.

Input stage 30 provides on selection line 34 a selection signal $S_s$ which characterizes two adjacent vectors. The selection signal is conducted to selection stage 35 which assigns to every value of $S_s$ the firing combinations which correspond to the adjacent vectors which define the appropriate angular range. If the angular ranges of the angle of rotation bounded by the two adjacent discrete vectors are continuously counted, in accordance with FIG. 1, in a predetermined counting direction, then the counting number of each angular range can be assigned unambiguously to one of the vectors. For example, each of the angular ranges, such as the anglular range between $Z_1$ and $Z_2$, is assigned one of running digital numbers 000 to 101. This digital number can be then assigned to one of the vectors $Z_1$ to $Z_6$ as a left or right adjacent vector. In this example, the selection stage assigns to the signal $S_s$ the two firing combinations $S_\alpha=100$ (which corresponds to $Z_\alpha=Z_1$) and $S_\beta=110$ (corresponding to $Z_\beta=Z_2$). Selection stage 35 then delivers, in response to switching signals i which are formed by comparator stage 37, a corresponding one of firing signals $S_a$ to $S_c$ in the corresponding combinations of $S_\alpha$ and $S_\beta$.

Input stage 30 further determines at outputs 32 and 33, by means of a function generator, the control signals for comparator stage 37, where the control signals correspond to the components of the voltage space vector relative to the two adjacent discrete vectors. In particularly simple situations where the maximum possible vector magnitude V* is to be generated for each position of the voltage space vector V, the corresponding dwell times $T_\alpha^*$ and $T_\beta^*$ can be selected as:

$$T_\alpha^* = (c)\sin(60°-\phi) \quad (4a)$$

$$\text{and } T_{62}^* = (c)\sin\phi; \quad (4b)$$

the quantity c being a constant value, and where the expression:

$$T^* = T_\alpha^* + T_\beta^* = c(\sin(60°-\phi) + \sin\phi) \quad (4c)$$

applies for the time interval T of the averaging and the magnitude of the voltage space vector is:

$$V^* = \frac{1}{\sqrt{3}}\frac{V_Z}{\sin(60°-\phi) + \sin\phi} \quad (4d)$$

Obviously, in this case the conditions of equation 3 are met. Thus, the function former needs to contain only a function generator to which the angle of rotation Φ is supplied as an angular variable which describes the angular position of the voltage space vector with respect to the adjacent vectors $Z_\alpha$ and $Z_\beta$. For every value of φ, only the function values $\sin(60°-\phi)$ and $\sin\phi$ need to be readout as components of the space vector V with respect to the two selected adjacent vectors.

It is advantage of the present invention that the input stage can be constructed with simple digital circuitry if the space vector corresponding to the desired values of the phase voltage to be addressed is determined in polar coordinates by its amplitude and phase angle components. For example, in the control of a synchronous machine, the magnet wheel position can be used directly as the angle components. For a digital control arrangement, it is advantageous to divide the rotation of the voltage space vector so that the angle component may be set into successively counted angle steps such that the angular steps bounded by the two adjacent vectors is resolved into $2^m$ angular steeps. For example, a full rotation of 360° of the voltage space vector can be resolved into 728 angular steps such that the angular resolution of $360°/728 \cong 0.5°$ is obtained. The angle of rotation Φ (angular component of the space vector) is fed-in as a ten-bit word. The m=7 end digits of the digital word represent the angle component and describe the relative angular position of the angular range bounded by $Z_\alpha$, and $Z_\beta$. These digits can be fed as a corresponding angle signal to the function former, while the remaining three beginning digits of the digital word are conducted to the selection stage as the selection signal $S_s$ for determining the angular range of the adjacent vectors to be selected. It is particularly advantageous to use a read-only memory for each of the function generator and the selection stage, each such read-only memory having addressing inputs to which are conducted the digital angle signal or the digital selection signal. Only the function $\sin \phi$ needs to be stored in the function generator because the angle function of $(60° - \phi)$ can be formed by producing the complement of the m-digit angle signal immediately after $\sin \phi$ is calculated.

At least one intermediate memory is arranged between function generator 36 and comparator stage 37 so as to provide, if required, the determined control signals corresponding to the dwell times. In the embodiment of FIG. 5, $T_\alpha$ is stored in intermediate memory 42, this dwell time being in accordance with equation (4a). The sum $T_\alpha + T_\beta$ is stored in an intermediate memory 43. In the special case where $V = V^*$ is observed, $T_\alpha = T_\alpha^*$ and $T_\beta = T_\beta^*$ applies.

Comparator stage 37 contains at least one comparator for a time comparison where, in response to a comparison of the running time signal generated in generator 38 with the components of the voltage space vector which is determined in input stage 30, switching signals i are formed which fix the dwell times for the discrete vector. Generator 38 determines in the digital device shown, a time-variable running time signal n by counting pulses of predetermined frequency, illustratively from a counter 39. The running time signal is initiated by setting counter 39 to zero via a reset input terminal 44. The running time signal is conducted to a first comparator 40 in comparator stage 37 together with dwelling time $T_\alpha$ for the vector $Z_\alpha$ and delivers, for example, for $n \leq T_\alpha$ the switching signal $i = 0$, with which the comparator stage selects the firing combination $S_\alpha$ from the two corresponding firing combinations $S_\alpha$ and $S_\beta$, which corresponds to $Z_\alpha$, and feeds it to the outputs $S_a$, $S_b$, and $S_c$.

For $T_\alpha < n \leq T_\beta + T_\alpha$, the other state of switching signal i is present and selection stage 35 generates the firing combination $S_\beta$ which corresponds to $Z_\beta$. If comparator 41 responds after receiving the dwell time sum $T_{60} + T_\beta = T$, according to the dwell time $T_\beta$, and the running time signal n, counter 39 is reset via reset input 44 and a new switching cycle of the inverter valves begins with a new start of the running time signal. Input stage 30 can be addressed simultaneously with this comparator signal, such that a new computation of the dwelling times can be made with the new start of the running time signal. An intermediate memory 45 is advantageously provided for storing the instantaneous desired-value setting for the voltage vector V, and makes it available to the function generator at the computing frequency.

If the running time signal is always started after one-sixth of the time of rotation of the voltage space vector, and if $\phi$ is set to equal either 0° or 60° (i.e., only $Z_\alpha$ or $Z_\beta$ are addressed in all angular ranges), the unpulsed operation is achieved having a maximum magnitude of the voltage vector.

By addressing in accordance with equation (4), the theoretically possible maximum value of the voltage space vector, which is determined by equation (4d) and which depends on the instantaneous value of the angular position $\phi$, is addressed. The end points of this space vector lie in the curve-in space shown in FIG. 4 as a straight line 20. Voltage utilization is particularly important for a pulse control method to achieve economy. It is customary to state the maximally attainable value of the fundamental amplitude contained in the output voltage, with reference to the maximum value which is achievable in unpulsed operation. With the maximum drive mentioned, an average fundamental amplitude of about 0.955 can be obtained such that the margin to full block control is only about 4.5%. Also harmonics of the 5th, 7th, and 11th order, in addition to the fundamental, are produced here in the interlinked output voltage. However, the amplitude of the 5th harmonic is only 4% of that of the fundamental, and all higher harmonics are insignificant.

According to equation (4d), the drive discussed so far always provides the maximum voltage $V^*$ ("full drive") of $V_Z$. Any desired voltage amplitude can therefore be generated by running the frequency converter such that $V_Z$ is controlled in accordance with the magnitude of the desired voltage, and therefore the frequency converter is not supplied with a constant DC input voltage. In this manner, the converter is then always driven fully.

The converter DC input voltage $V_Z$ may be a constant, and the voltage can be operated with a drive which is dependent upon the magnitude of the desired voltage, and may optionally be below full drive. Here, the method described so far must be supplemented by including the zero state $Z_0$ (same state condition). The zero state $Z_0$, which is present for the duration $T_0$, has the effect that the length of the voltage space vector, averaged over the duration T of one switching cycle, is shorted in accordance with the ratio:

$$\frac{V}{V^*} = (T_\alpha + T_\beta)/(T_\alpha + T_\beta + T_o)$$

$$= T_\alpha/T + T_\beta/T$$

For the case under consideration where $T_\alpha$ and $T_\beta$ are determined independently of the voltage amplitude absolute V according to equations (4a) and (4b) from the space vector position with respect to the angle variable which determines the two adjacent vectors $Z_\alpha$ and $Z_\beta$, it follows that the duration T must be chosen according to:
$$T = c (\sin (60° - \phi) + \sin \phi) V^*/V$$

This can be achieved, for example, by supplying the value:

$$T_\alpha + T_\beta = c (\sin (60° - \phi) + \sin \phi)$$

which is present at output 33 to a multiplier so as to multiply it by a quantity $V^*/V$ which must be fed-in accordingly. The end of the switching cycle is then determined by means of a further comparator through comparison of the multiplier output with the running time signal, while the output signal of comparator 41 is entered as a further switching signal to distributor stage 35. Distributor stage 35 then switches for $n \leq T_\alpha + T_\beta$ from the switching combination $S_\beta$ corresponding to $Z_\beta$ to one of the combinations $S_- = (000)$ or $S_+ = (111)$ belonging to $Z_0$ and maintains this same state condition until the end of the switching cycle.

A simpler method than the foregoing is possible if the duration of the switching cycle (i.e., the running time of the running time signal or the respective start of the running time signal), is externally predetermined. Thus, the start of the running time signal can be set, for example, with a constant frequency, or with a set-in frequency which is synchronized with the rotation of the voltage vector, or another rotating reference variable, illustratively a connected synchronous machine.

In this case, where the switching time T is given externally so that $T=T_e$, the calculation can be performed corresponding to equation (3) which is modified so as to provide the following modified equation (3'):

$$T_\alpha = T_e \sin(60° - \phi) \cdot \sqrt{3} \ \frac{V}{V_{z-}} = \text{const} \cdot V\sin(60° - \phi) \quad (3'a)$$

$$T_\beta = T_e \sin\phi \cdot \sqrt{3} \ \frac{V}{V_{z-}} = \text{const} \cdot V\sin\phi \quad (3'b)$$

Figure 6:
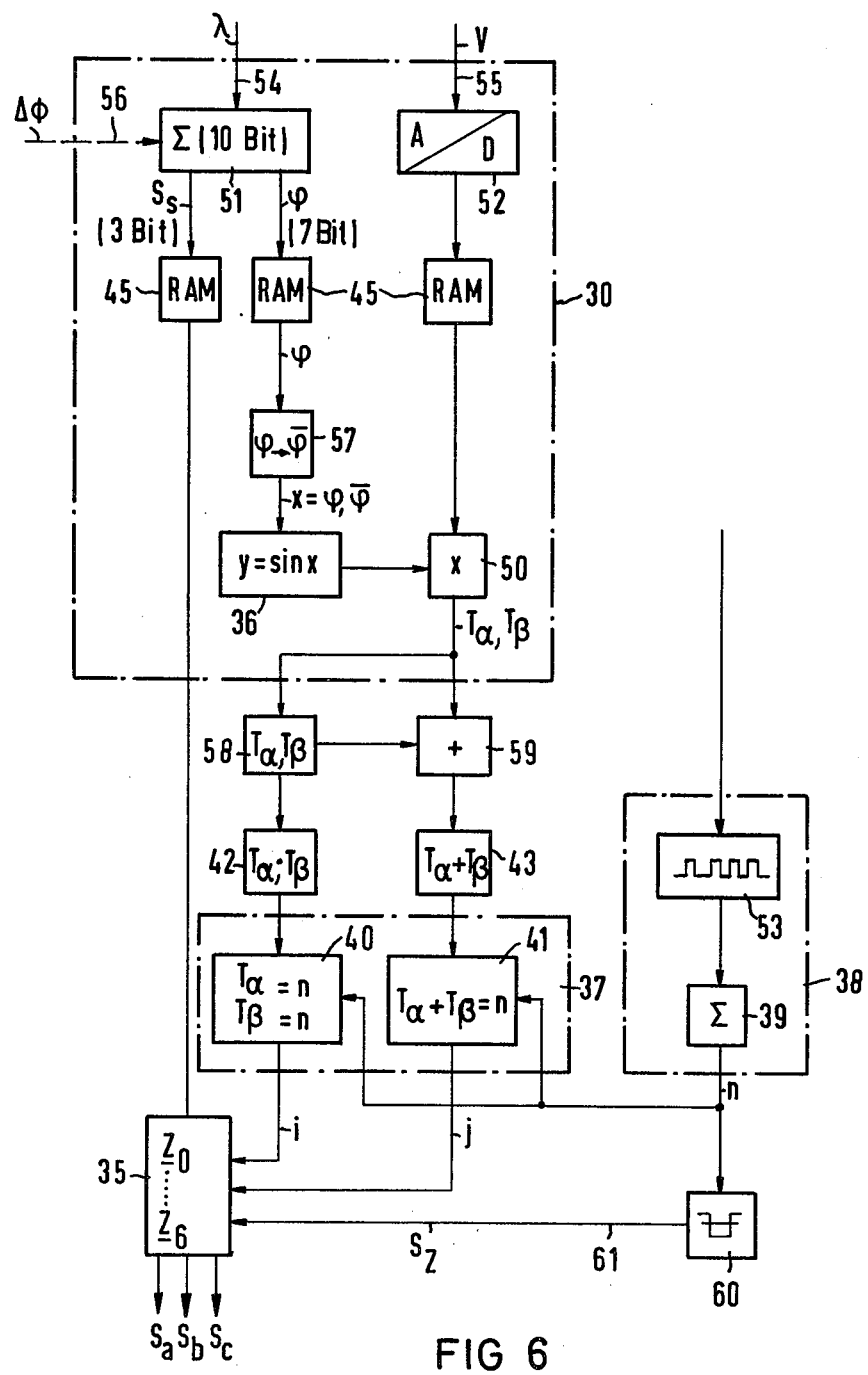
FIG. 6 is a block and line representation of a further embodiment of the invention.

The dwell times for the two firing combinations $Z_\alpha$ and $Z_{62}$ can therefore be determined from the angle and the magnitude of the desired voltage space vector. Function former 30 from FIG. 5 must therefore be supplemented in this case by a multiplier 50 which receives the absolute value of voltage V in addition to the output signal from function generator 36. FIG. 6 shows a function block representation of such a circuit where the components are provided with the same reference symbols utilized in the structure of FIG. 5.

The voltage space vector can be advantageously set-in by providing for the space vector V an absolute value V and a frequency-proportional signal λ as the desired values for the control. For example, 728 counting pulses may correspond to one revolution of voltage vector. In a bidirectional counter 51, the frequency-proportional pulses are integrated, where the last seven binary digits of the signal are taken off at the output as the selection signal $S_s$, and reverse counting corresponds to a reversal of the direction of rotation. Counter 51 acts as an angle discriminator, which resolves the angle Φ of the voltage vector modulo 60° (corresponding to the angle between two adjacent vectors). In addition to inputs 54 and 55 where frequency λ and absolute amount V are provided, an additional input 56 is provided to change the angle of the voltage space vector quickly by adding a supplemental angle ΔΦ for dynamic control devices.

The absolute value of the voltage V which is provided in analog form, is converted into a corresponding digital signal in an analog to digital converter 52. Write and read memories (RAMs) 45 serve for the interim storage of the values of $S_s$, $\phi$ and V which are read at the start of a switching cycle (i.e., at the start of the running time signal). The running time signal is generated in generator 38 by a voltage-controlled pulse generator 53, the counting pulses of which are cyclically counted by a counter 39 up to a maximum number $N_0$. A pulse generator 53 operates at a frequency $f_f$, and the start of the running time signal always occurs after the switching cycle duration $T_e = N_0/f_f$.

The components of the space vector with respect to the vectors adjacent to the right and to the left, which are determined by the selection signal $S_s$, i.e., the dwelling times for the corresponding firing combinations, are determined by a function former containing a read-only memory (ROM) 36 and multiplier 50. In ROM 36, the function values $Y = \text{const} \cdot \sin x$ are stored in the locations $x=1$ to 128, and its output is conducted, together with the absolute digital voltage value V to multiplier 50. If the function former is addressed by the value V, and the address $x=\phi$, then it provides, in accordance with equation (3'b) the value $T_\beta = c \cdot \sin \phi \cdot V$. The value $T_\alpha = c \cdot \sin(60° - \phi) \cdot V$ is formed by converting every bit of angle signal $\phi$ at a complement former 57 which precedes the input of ROM 36, and thus the input address $x = 60° - \phi$ is formed for the ROM.

Complement former 57 is addressed so that during the rotation of the space vector, first $T_\beta$ is calculated corresponding to $x=\phi$, and subsequently $T_\alpha$ is calculated corresponding to $x=\phi$ in every other angular range which is bounded by the vectors. In the regions therebetween, the converse occurs in that first $x=\phi$ and $T_\alpha$ are formed. It is thereby ensured that upon the passage of the space vector from one angular range to the next, the sequence in time of forming $T_\alpha$ and $T_\beta$ is always reversed. This results in the course of switching that, in successive regions, $Z_\alpha$ and $Z_\beta$ are addressed in time in the reverse order, and can be utilized for optimizing the switching sequence which will be explained hereinbelow. The complement former can be addressed by the last bit of selection signal $S_s$.

The values of $T_\alpha$ and $T_\beta$ which are determined at the start of each switching cycle are stored in two-series connected interim memories 58 and 42, and are added together at a summing point 59 such that the resultant addition $T_\alpha + T_\beta$ is read into the intermediate memory 43.

Comparator stage 37 contains two comparators, 40 and 41, for comparing control signals $T_\alpha$ and $T_\beta$, respectively, and $T_\alpha + T_\beta$ which is available from memories 42 and 43 with the running time signal n of counter 39. The selection stage which is in the form of a ROM, is addressed by the output signals of the comparators as well as selection signal $S_s$, and delivers, according to its programming, the firing signals $S_a$, $S_b$, and $S_c$ for the inverter valves in the respective desired combination. The programming for this ROM is accomplished in accordance with the following optimization:

Within a switching cycle, a shift is made directly from one firing combination to the other firing combination and the addressing of the same state condition is to be accomplished before, or preferably after, each such shift. If the addressing were such that a same state condition is addressed always after a firing combination and before a subsequent firing combination, a large number of switching operations would result. It is also advantageous to alternate between positive and negative terminal connections when the same state condition is addressed. Preferably, each firing combination is addressed once within the switching cycle; the sequence of the two combinations being reversed in time in successive switching cycles.

In all, this operation results in an optimum firing sequence if, for an addressing which starts in the first angular range with $Z_\beta = Z_2$, the firing combinations $S = (110), (100), (000)$ and the next switching cycle (100), (110), (111) are addressed. If a transition is now made to the angular range characterized by $Z_\alpha = Z_2$ and $Z_\beta = Z_3$, then the firing combination sequence (110), (010), (000); (010), (110), (111) is obtained. In the third angular range, one starts again with $Z_\beta$, i.e., $Z_4 = (011)$. It is therefore seen that for a shift, only one firing signal within a firing combination is changed and therefore only the inverter valve which operates on one output is switched.

In order to reverse the addressing $Z_\alpha$ and $Z_\beta$, which, as noted, must be effected between each of two successive switching cycles, a logical switching element 60 is connected to the output of running time generator 38 so as to change the sign of a time sequence control signal $S_z$ which is delivered via a line 61 for each new start of the running time signal. ROM 35 is addressed by the selections signal $S_s$, the time sequence control signal $S_z$, and the outputs of comparators 40 and 41. ROM 35 contains at each addressed storage location a three-bit word, each bit of this three digit word being assigned a corresponding output line which delivers a respective one of firing signals $S_a$, $S_b$, and $S_c$ which are respectively assigned to an inverter output, thereby addressing the inverter valves which are associated with corresponding outputs a, b, and c.

In forming the control signals $T_\alpha$ and $T_\beta$, the condition $$T_\alpha + T_\beta = T_e$$

must be observed, because otherwise the dwell times of the two firing combinations $S_\alpha$ and $S_\beta$ would exceed the predetermined switching cycle duration $T_e$. This case is present if the space vector given by the desired voltage values exceeds the maximum amount $V^*$ given by equation (4d) (overdrive). In this case, unduly large dwell times $\overline{T}_\alpha$ and $\overline{T}_\beta$ are determined by equation (3'). These must therefore be reduced proportionately in the ratio $T_e/\overline{T}_\alpha + \overline{T}_\beta)$, so that one obtains:

$$T_\alpha = \frac{c \cdot T_e \cdot \sin(60° - \phi)}{\sin(60° - \phi) + \sin\phi} \quad \text{(3a'' for } V \geq V^*\text{)}$$

$$T_\beta = \frac{c \cdot T_e \cdot \sin\phi}{\sin(60° - \phi) + \sin\phi} \quad \text{(3b'' for } V \geq V^*\text{)}$$

This corresponds to the case of full drive discussed above with respect to FIG. 5 where the switching cycle duration $T_s = T^*_\alpha + T^*_\beta$.

Overdrive always occurs for (sin (60°−φ)+ sin φ)>1, and can be recognized, for example, from the fact that an overflow for the most significant bit occurs at summing point 59. With this overflow, function generator 36 of the function former can be addressed so that a function y=const. sin x/(sin (60°−x)+ sin x) is called up at another one to eight storage locations. These values are then passed on to multiplier 50 and multiplied there by a constant which is made available at the output of the analog to digital converter 52 by means of a limiting circuit if the absolute voltage value V exceeds the maximum V*. The preveiously determined uncorrected control signals in memories 58, 42, and 43 are overwritten with the corrected control signals $T_\alpha$, and $T_\beta$ which are obtained in this manner, so that the proper (corrected) dwell times can be compared with the running time signal n in comparator stage 37 in the case of full drive. Thus, a space vector control which is true as to angle with the maximum absolute voltage value is assured for a predetermined reference angle $\Phi^*$ for the desired spaced vector.

For the case shown in FIG. 4 where the absolute value of the space vector V is within the area shown by the circle in which full drive is not reached, a linear relationship is always obtained between the space vector which is predetermined for controlling the output voltage and the space vector of the voltage which is actually present at the inverter output. The inventive method deals a voltage utilization which approaches the theoretically attainable maximum value of $\pi/2\sqrt{3} = 0.907$ for a sinusoidal control of the inverter output voltages and is about 15% higher than with pure sine-triangle modulation. With a large frequency ratio of the reversing clock frequency to the fundamental frequency, the spectrum of harmonics is comparable with this method to the harmonics spectrum with sine-triangle modulation. For frequency ratios under 15, however, more advantageous properties are obtained if the relative distortion current is made the base of comparison for the commonly used criterion with respect to the effects of the harmonics on the output current.

Although the invention has been described in terms of specific embodiments and applications, persons skilled in the art can generate additional embodiments, in light of this teaching, without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A method for driving a frequency converter, which comprises:
   providing a DC voltage across DC input terminals of the frequency converter;
   forming a plurality of addressing signals;
   connecting the DC input voltage to phase outputs of the frequency converter in response to the addressing signals, said DC input voltage producing one of a plurality of discrete space vectors at a load connected to the phase outputs for each respective combination of the plurality of addressing signals; and
   quasi-continuously controlling the output voltage in response to voltage reference values, a step which further comprises:
   forming a variable voltage space vector composed of the voltage reference values;
   determining which two discrete space vectors are adjacent to the variable voltage space vector;
   determining components of said variable voltage space vector that coincide with the adjacent discrete space vectors, said components being formed as the control signals;
   generating a running time signal;
   comparing the running time signal against the control signals in order to produce a switching signal for switching at least one addressing signal from one state to another; and
   addressing the adjacent discrete space vectors for respective time durations that correspond to the control signals, said addressing done in a preselected sequence after the start of the running time signal.

2. The method of claim 1 wherein the running time signal determines a switching cycle having a switching cycle time period greater than the sum of the respective time durations during which the adjacent discrete space vectors are addressed, the method comprising the further step of switching all of the addressing signals into a same state condition wherein all of the phase outputs are connected to one of the positive or negative DC input terminals such that all output voltages are in the same state for a same state time period during the switching cycle, the same state time period being exclusive of the sum of the respective time durations during which the adjacent discrete vectors are addressed, the switching cycle time period being selectably one of variable duration or fixed duration, the duration of the variable duration switching cycle time period determined from an angular position of the variable voltage space vector and the magnitude of the variable voltage space vector, the angular position of the variable voltage space vector being determined from the position of the variable voltage space vector with respect to the adjacent discrete vectors, the duration of the fixed duration switching cycle time period determined from said angular position of the variable voltage space vector and the magnitude of the variable voltage space vector.

3. The method of claim 2 wherein there are provided the further steps of:
   switching at least one addressing signal within the switching cycle such that the combination of the plurality of addressing signals shift between the addressing of one of the adjacent discrete space vectors to the addressing of the other adjacent discrete space vector; and
   switching all of the addressing signals into the same state condition during the same state time period, the same state time period occurring selectably prior to and after said shifting of addressing signals between the addressing of the adjacent discrete space vectors occurs.

4. The method of claim 2 or 3 wherein during successive steps of switching all of the addressing signals into the same state condition, all of the phase outputs are alternatingly connected to one of the positive or negative DC input terminals.

5. The method of claim 4 wherein during successive switching cycles said preselected sequence in which said adjacent discrete space vectors are addressed is reversed.

6. The method of claim 5 wherein said steps of addressing said adjacent discrete space vectors and switching all of the addressing signals into the same state condition are performed sequentially such that only one of the addressing signals changes for each subsequent addressing step.

7. The method of claim 6 wherein the running time signal is generated externally.

8. The method of claim 7 wherein the externally generated running time signal is synchronized with a selectable one of the variable voltage space vector and a rotating reference quantity.

9. The method of claim 8 wherein there are provided the further steps of:
   operating the frequency converter in an unpulsed mode; and
   starting the running time signal after one-sixth of the time of rotation of the variable voltage space vector and only addressing a selected one of the adjacent discrete vectors which is adjacent to the variable voltage space vector in the same direction of rotation.

10. An apparatus for forming addressing signals for addressing respective converter switches of a frequency converter, the apparatus being of the type wherein the frequency converter is provided with DC input terminals for receiving electrical energy which is conducted to phase output terminals in response to the operation of the converter switches, the apparatus further comprising:
   input stage means having a selection output terminal for providing a selection signal which identifies two adjacent discrete vectors which are adjacent to a voltage space vector composed of phase voltages which can be addressed by set-in reference values;
   function former means in said input stage means for determining control signals corresponding to components of said voltage space vector with respect to said adjacent discrete vectors;
   generator means for producing a running time signal;
   comparator stage means having at least one comparator for fixing respective dwell times during which said adjacent discrete vectors are addressed, said comparator stage means comparing said running time signal with said components of said voltage space vector; and
   selection stage means for delivering the addressing signals corresponding to said adjacent discrete vectors in response to said selection signal and said comparator stage means.

11. The apparatus of claim 10 wherein said function former means further comprising:
   function generator means for receiving an angle quantity which describes the angular position of said voltage space vector with respect to said adjacent discrete vectors; and
   multiplier means connected to said function generator means for receiving an absolute value of said voltage space vector.

12. The apparatus of claim 10 and 11 wherein said input stage means contains first and second inputs for receiving signals corresponding to the polar coordinate components of the voltage space vector wherein the angle component is represented by a digital word, a revolution being divided into successively counted angle steps, each such angle step forming an angular range bounded by two adjacent discrete vectors, there being provided $2^m$ angular steps and m ones of the digits of the digital word being formed as an angle signal describing the relative angle position of said voltage space vector, first read-only memory means having an input for receiving said m ones of said digits of said digital word, said first read-only memory means operating as a function generator, and second read-only memory means functioning as said selection stage means for receiving remaining ones of the digits of said digital word.

13. The apparatus of claim 12 wherein there are further provided a plurality of intermediate memories connected at respective inputs of said function generator means and said comparator stage means.

14. The apparatus of claim 13 wherein said inut stage means receives a supplemental reference angle signal for said voltage space vector.

* * * * *